(12) United States Patent
Müller et al.

(10) Patent No.: US 9,425,704 B2
(45) Date of Patent: Aug. 23, 2016

(54) POWER INVERTER WITH MULTI-FED ON-BOARD POWER SUPPLY FOR SUPPLYING A CONTROLLER

(75) Inventors: Burkard Müller, Kassel (DE); Lars Bethke, Göttingen (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 1014 days.

(21) Appl. No.: 13/597,857

(22) Filed: Aug. 29, 2012

(65) Prior Publication Data
US 2012/0319495 A1 Dec. 20, 2012

Related U.S. Application Data

(63) Continuation of application No. PCT/EP2011/053219, filed on Mar. 3, 2011.

(30) Foreign Application Priority Data

Mar. 3, 2010 (EP) ..................................... 10155355

(51) Int. Cl.
*H02M 7/48* (2007.01)
*H02J 3/38* (2006.01)
(Continued)

(52) U.S. Cl.
CPC .................. *H02M 7/48* (2013.01); *H02J 3/383* (2013.01); *H02J 7/35* (2013.01); *H02J 9/062* (2013.01);
(Continued)

(58) Field of Classification Search
CPC ............ H02M 7/48; H02M 2001/008; H02M 2001/0006; H02J 3/383; H02J 9/062; H02J 7/35; Y10T 307/707; Y02E 10/766; Y02E 10/763; Y02E 10/566; Y02E 10/563; Y02B 10/72

USPC ......................... 307/80, 82, 44, 36, 48, 45, 46
See application file for complete search history.

(56) References Cited

U.S. PATENT DOCUMENTS 6,650,028 B1 * 11/2003 Cornelius ............... H02J 9/061
307/43
8,106,535 B2 1/2012 Nishimura
(Continued)

FOREIGN PATENT DOCUMENTS

CN 101527507 A 9/2009
CN 201374568 Y 12/2009
(Continued)

OTHER PUBLICATIONS

Edelmoser, K. H. et al.: "Bi-directional DC-to-DC converter for solar battery backup applications" Power electronics Specialists conference 2004, Pesc 04. 2004 IEEE 35th annual Aachen, Germany, Jun. 20-25, 2004, Piscataway, NJ, USA, IEEE, US-LNKD-DOI;10.1109/PESC.2004.1355437, Bd. 3, Jun. 20, 2004, p. 2070-2074. 5 Pages.
(Continued)

*Primary Examiner* — Jared Fureman
*Assistant Examiner* — Michael Warmflash
(74) *Attorney, Agent, or Firm* — Eschweiler & Associates, LLC

(57) ABSTRACT

An inverter includes a DC/AC converter connectable to a DC power grid, at least one DC/DC converter arranged upstream of the DC/AC converter and providing a galvanic isolation, and a DC voltage link at the input of the at least one DC/DC converter and connectable to at least one DC power source. The inverter also includes at least one further DC voltage link which is galvanically isolated from the first DC voltage link by the DC/DC converter, on-board voltage rails supplying a controller and other auxiliary devices of the inverter with electric energy; and an on-board supply unit. The on-board supply unit is configured and adapted to feed the electric energy into the on-board voltage rails both out of the first DC voltage link and out of the at least one further DC voltage link.

19 Claims, 2 Drawing Sheets

(51) Int. Cl.
*H02J 7/35* (2006.01)
*H02J 9/06* (2006.01)
*H02M 1/00* (2006.01)

(52) U.S. Cl.
CPC . *H02M 2001/0006* (2013.01); *H02M 2001/008* (2013.01); *Y02B 10/72* (2013.01); *Y02E 10/563* (2013.01); *Y02E 10/566* (2013.01); *Y10T 307/707* (2015.04)

(56) References Cited

U.S. PATENT DOCUMENTS

| | | | | |
|---|---|---|---|---|
| 8,212,409 | B2* | 7/2012 | Bettenwort et al. | 307/82 |
| 8,253,424 | B2* | 8/2012 | Wolf et al. | 324/548 |
| 8,339,126 | B2* | 12/2012 | Izak et al. | 324/207.25 |
| 8,648,497 | B2* | 2/2014 | Stern | 307/82 |
| 2002/0000796 | A1* | 1/2002 | Popescu | H02M 1/40 323/276 |
| 2008/0094867 | A1* | 4/2008 | Muller et al. | 363/56.05 |
| 2008/0111517 | A1* | 5/2008 | Pfeifer et al. | 320/101 |
| 2008/0266922 | A1* | 10/2008 | Mumtaz et al. | 363/131 |
| 2009/0236916 | A1 | 9/2009 | Nishimura | |

FOREIGN PATENT DOCUMENTS

| | | | |
|---|---|---|---|
| EP | 1107438 A2 | 6/2001 | |
| EP | 2058921 A1 * | 5/2009 | |
| JP | 2005157488 A | 6/2005 | |
| JP | 2008157488 A | 7/2008 | |
| JP | EP 2058921 A1 * | 5/2009 | ............... H02J 7/35 |
| JP | 2009142052 A | 6/2009 | |

OTHER PUBLICATIONS

Torreshan H. et al.: "Auxiliary power supplies for high voltage converter systems" Power Electronics specialists conference, 2004, Pesc 04. 2004 IEEE 35th Annual Aachen, German Jun. 20-25, 2004, Piscataway, NJ, USA, IEEE, US-LNKD-DOI; 10.1109/PECS.2004. 1355824, Jun. 20, 2004, pp. 645-651. 7 Pages.

International Search Report & Written Opinion dated May 11, 2011 for International Application No. PCT/EP2011/053219. 9 Pages.

English translation of Chinese Office Action dated Aug. 4, 2014 issued in parallel Chinese application No. 201180007866.X.

English translation of Japanese Office Action dated Aug. 21, 2014 issued in parallel Japanese application No. 2012-555431.

* cited by examiner

POWER INVERTER WITH MULTI-FED ON-BOARD POWER SUPPLY FOR SUPPLYING A CONTROLLER

CROSS REFERENCE TO RELATED APPLICATIONS

This application is a continuation of International Application number PCT/EP2011/053219, filed on Mar. 3, 2011, which claims priority to European Application number 10155355.0, filed on Mar. 3, 2010.

FIELD

The present invention relates to a power inverter for feeding electric energy from a DC power source into an AC power grid. More particularly, the present invention relates to a power inverter comprising a controller, which for example controls the switches of inverter bridges of the inverter in a coordinated way, and an on-board power supply supplying this controller as well as other auxiliary devices with electric energy.

BACKGROUND

In power inverters for feeding electric energy from a DC power source into an AC power grid, it is known to galvanically isolate the AC power grid from the DC power source by means of a DC/DC converter. Such a DC/DC converter is connected upstream of a DC/AC converter of the inverter and galvanically isolates a DC voltage link at its input from a DC voltage link between the DC/DC converter and the DC/AC converter, for example by means of a high frequency transformer or by means of a high frequency AC voltage link with galvanically isolating capacitors. A further converter stage, like for example a boost or buck converter, may be provided between the DC power source and the DC voltage link at the input of the DC/DC converter. Typically, the capacitance of the DC voltage link at the input of the galvanically isolating DC/DC converter is smaller than the capacitance of the DC voltage link between the galvanically isolating DC/DC converter and the DC/AC converter, because a smaller buffer capacitance is sufficient for supplying the high frequency AC voltage link of the DC/DC converter as compared to supplying the inverter bridges of the DC/AC converter. When the inverter is switched off, however, the large capacitance of the DC voltage link between the DC/DC converter and the DC/AC converter is to be discharged within a defined interval of time in a controlled way for security reasons.

For the purpose of feeding on-board voltage rails of power inverters including the inverters described above, it is known to have an on-board supply unit which generates the required auxiliary voltages via a flyback converter out of a DC voltage which is present in a DC voltage link of the inverter. It is preferred to feed the on-board voltage rails out of a DC voltage link which is already loaded by a connected DC power source even prior to starting the inverter. It is also known to use the AC voltage of a connected AC power grid as an alternative power source for the on-board power supply.

EP 1 107 438 A2 discloses a balancing circuitry for two partial capacitances of a DC voltage link of a power inverter, which are connected in series. In this balancing circuitry the partial voltages at the partial capacities are each used for feeding one primary winding of a flyback converter, which is used as an on-board supply unit feeding on-board voltage rails of the inverter.

EP 2 058 921 A1 discloses a power inverter for feeding electric energy from a DC power source into an AC power grid. Here, a charger/discharger circuit is arranged between a DC voltage link at the input of a DC/AC converter of the power inverter and an accumulator to load this accumulator out of the DC voltage link and to pre-charge the DC voltage link out of the accumulator if needed. Further, the accumulator serves as a secondary power source of an on-board power supply of this known inverter.

There still is a need for a power inverter for feeding electric energy from a DC power source into an AC power grid, which comprises optimized on-board power supply.

SUMMARY OF THE INVENTION

The present invention relates to a power inverter for feeding electric energy from at least one DC power source into an AC power grid. The inverter comprises a DC/AC converter configured and adapted to be connected to the AC power grid, at least one DC/DC converter arranged upstream of the DC/AC converter and providing a galvanic isolation between its input and output. The inverter also comprises a first DC voltage link, which is arranged at the input of the at least one DC/DC converter, and which is configured and adapted to be connected to the at least one DC power source, and at least one further DC voltage link, which is arranged between the DC/DC converter and the DC/AC converter, and which is galvanically isolated from the first DC voltage link by the DC/DC converter. Lastly, the inverter comprises a controller; on-board voltage rails configured and adapted to supply the controller with electric energy, and an on-board supply unit configured and adapted to feed the electric energy into the on-board voltage rails. The on-board supply unit is configured and adapted to feed the electric energy both out of the first DC voltage link and out of the at least one further DC voltage link.

BRIEF DESCRIPTION OF THE DRAWINGS

The invention can be understood better with reference to the following drawings, in which emphasis is placed upon clearly illustrating the principles of the present invention. In the drawings, like reference numerals designate corresponding parts throughout the several views.

DETAILED DESCRIPTION

Figure 1:
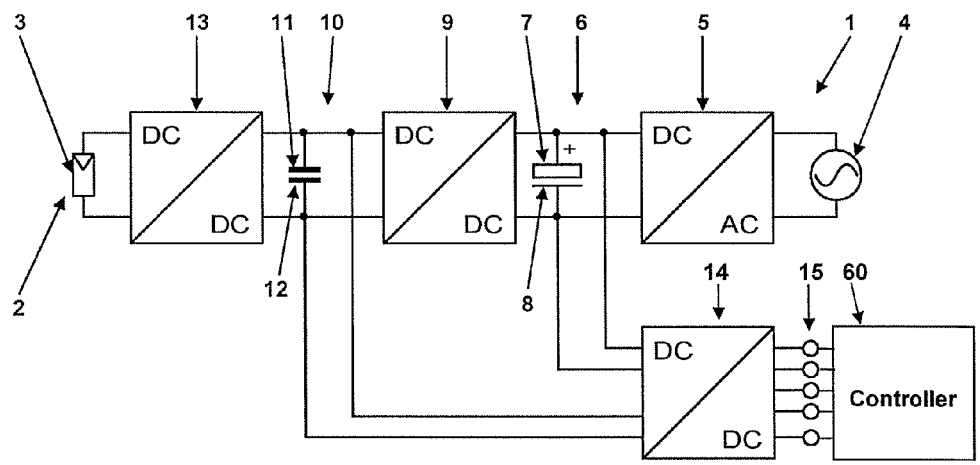
FIG. 1 illustrates a first embodiment of the power inverter.

The present invention relates to a power inverter for feeding electric energy from a DC power source into an AC power grid. More particularly, the present invention relates to a power inverter comprising a controller, which for example controls the switches of inverter bridges of the inverter in a coordinated way, and an on-board power supply supplying this controller as well as other auxiliary devices with electric energy.

The DC power source may particularly be a photovoltaic generator or a wind power plant. The AC power grid may be a public power grid or an island grid. The number of loads in the AC power grid is not important. Thus, the power inverter may be used for supplying a single load with electric energy from the power source.

In the power inverter of the present invention, the on-board voltage rails are fed with electric energy by the on-board supply unit out of the first DC voltage link at the input of the at least one DC/DC converter, on the one hand, and out of at least one further DC voltage link which is galvanically isolated from the first DC voltage link, on the other hand. The at least one further DC voltage link may be the DC voltage link at the input of the DC/AC converter. The supply out of the first DC voltage link at the input of the at least one DC/DC converter has the advantage that this DC voltage link is directly loaded by the DC power source with increasing output voltage of the DC power source, and that, thus, a link voltage is available already prior to activating the inverter. Further, electric energy which is taken out of this DC voltage link has not yet passed the at least one DC/DC converter, which is advantageous with regard to the efficiency of the on-board power supply out of the DC power source. The alternative feeding of the on-board voltage rails with electric energy out of the at least one further DC voltage link between the DC/DC converter and the DC/AC converter, on the other hand, has the advantage that it still allows a feeding of the on-board voltage rails even if the link voltage at the input of the DC/DC converter breaks down, because no more electric energy is forwarded by the connected DC power source, for example, due to a total breakdown of the DC power source. Further, feeding the on-board voltage rails with electric energy out of the DC voltage link between the DC/DC converter and the DC/AC converter results in discharging this further link even if the adjacent DC/DC and DC/AC converters are switched off. Correspondingly, an additional discharge device, particularly a discharge resistor, which generates permanent power losses can be avoided. This increases the overall efficiency of the power inverter.

An on-board supply unit of the power inverter may primarily feed the on-board voltage rails and generate the required auxiliary voltages out of the first DC voltage link at the input of the DC/DC converter and only secondarily out of the at least one further DC voltage link. This ranking order in feeding the on-board voltage rails considers that the first DC voltage link is already loaded by the DC power source prior to starting the inverter. Further, use is made of the higher efficiency of the on-board power supply out of the first DC voltage link due to an avoided power conversion by the DC/DC converter. Additionally, drawing energy out of the further DC voltage link between the DC/DC converter and the DC/AC converter, which may, at acceptable efforts, not always be effected at a constant rate, superimposes a noise to the link voltage in this DC voltage link, which is preferably kept constant. This noise is reduced to a minimum, if electric energy is only taken out of this further DC voltage link, when this electric energy is not available from the first DC voltage link at the input of the DC/DC converter. In normal operation, however, this situation does not occur so that in normal operation the link voltage in the further DC voltage link between the DC/DC converter and the DC/AC converter is not disturbed.

The primacy of feeding the on-board voltage rails out of the first DC voltage link may, for example, be realized by means of a controller of the on-board supply unit, which closed-loop controls an on-board supply voltage present at the on-board voltage rails. This voltage controller may differently define the feeding powers fed into the on-board voltage rails out of the first DC voltage link and out of the further DC voltage link based on a difference between the actual value of the on-board supply voltage and a reference value. For example, different variables may be effective for the two different feeding powers of the on-board supply unit into the on-board voltage rails. The voltage controller may particularly be adjusted in such a way that it first only increases the feeding power requested from the first DC voltage link at the input of the DC/DC converter, when the actual value of the on-board supply voltage drops below the reference value. If the difference between the actual value of the on-board supply voltage and the reference value nevertheless remains, the voltage controller also requests power from the further DC voltage link between the DC/DC converter and the DC/AC converter.

The voltage controller for the on-board supply voltage itself may first be supplied with electric energy out of the first DC voltage link at the input of the DC/DC converter, until the on-board supply voltage is present. Afterwards the voltage controller of the on-board supply unit may be supplied with electric energy by the on-board supply voltage.

All advantages of the power inverter due to its on-board power supply described above are particularly relevant, if a capacitance of the first DC voltage link at the input of the DC/DC converter is much smaller than the capacitance of the further DC voltage link between the DC/DC converter and the DC/AC converter. The original reason for having a big capacitance of the further DC voltage link between the DC/DC converter and the DC/AC converter is to keep the link voltage at the input of the DC/AC converter constant, even with the low-frequency power pulsation of single-phase DC/AC-converters. By also feeding the on-board voltage rails with electric energy out of the DC voltage link between the DC/DC converter and the DC/AC converter a considerable additional amount of electric energy is available to the on-board supply unit due to the high capacitance of this further DC voltage link. At the same time, feeding the on-board voltage rails out of the further DC voltage link replaces a discharge device which would have to be of large dimension to securely discharge the capacitance of the further DC voltage link within a defined period of time. With single-phase DC/AC-converters, the capacitance of the first DC voltage link at the input of the DC/DC converter will nearly always be less than 50% of the capacitance of the further DC voltage link between the DC/DC converter and the DC/AC converter. In the power inverter described here it will most often be less than 25% of the capacitance of the further DC voltage link 10%. Often, the capacitance of the first DC voltage link at the input of the DC/DC converter will be less than 10% or even less than 5% of the capacitance of the further DC voltage link between the DC/DC converter and the DC/AC converter.

In an actual embodiment of the power inverter, the on-board supply unit may comprise a flyback converter fed out of the first DC voltage link at the input of the DC/DC converter and a further flyback converter fed out of the further DC voltage link between the DC/DC converter and the DC/AC converter. Alternatively, a single flyback converter with a single transformer may be provided, which is fed both out of the first DC voltage link at the input of the DC/DC converter and out of the further voltage link between the DC/DC converter and the DC/AC converter. Each flyback converter may operate in a voltage mode or, as usual with switching power supplies having a flyback converter, in a current mode control scheme.

For the purpose of combining the two branches of the on-board supply unit, the on-board supply unit may generally have a transformer comprising two primary windings electrically isolated with regard to each other, one of which is fed out of the first DC voltage link at the input of the DC/DC converter, and the other of which is fed out of the further DC voltage link between the DC/DC converter and the DC/AC converter. The primary windings isolated with regard to each other do not challenge the galvanic isolation of the two DC voltage links out of which the on-board voltage rails are fed. If the DC/DC converter provides a voltage transformation in addition to the galvanic isolation between these two DC voltage links, so that the two link voltages differ in general, the primary windings of the transformer of the on-board supply unit may comprise a winding ratio which corresponds to 50% to 200%, particularly to 70% to 140% to the transformation ratio of the DC/DC converter. In other words, the winding ratio should essentially be equal to the transformation ratio of the DC/DC converter.

If current is fed at the same time to both primary windings out of the first and the further DC voltage link, a synchronization of the currents fed to both primary windings of the transformer of the on-board supply unit is useful. For this purpose, all switches via which the primary windings are fed with current may be synchronized. If all these switches are controlled by a single voltage controller for the on-board supply voltage, it is desirable in one embodiment with regard to the galvanic isolation of the two DC voltage links on both sides of the DC/DC converter to transfer at least one control signal from the voltage controller to at least one of the two galvanically isolated primary windings via at least one optocoupler.

For the purpose of being able to activate the controller of the power inverter, even if no DC power source is connected, or if, for example, a photovoltaic generator as the DC power source does not provide electric energy at night for a longer period of time, the on-board supply unit may also feed the on-board voltage rails with electric energy out of an AC power grid connected to the DC/AC converter. Here, a smaller reference value for the on-board supply voltage may be set in a voltage controller for the feeding power out of the AC power grid than in the voltage controller for the feeding power out of the two DC voltage links. Thus, as long as the on-board voltage rails is fed out of the DC voltage links, no feeding power into the on-board voltage rails is requested from the AC power grid.

The on-board voltage rails may additionally be fed with electric energy out of any additional link of the inverter. With regard to the various power sources of the on-board power supply, it is, however, useful to have a ranking order starting at the top with that source(s) which corresponds to the lowest consumption of electric energy with regard to the primary production of the electric energy.

The power inverter may also have one or more further converter stages between the DC power source and the first DC voltage link at the input of the DC/DC converter, like for example boost converters to which additional voltage links may be associated. Thus, the first DC voltage link is not necessarily directly connected to the DC power source. However, no galvanic isolation should exist between the DC power source and the first DC voltage link at the input of the DC/DC converter, if the first DC voltage link shall be passively chargeable out of the DC power source, i.e. prior to active operation of the further converter stages.

Referring now in greater detail to the drawings, the inverter 1 illustrated in FIG. 1 serves for feeding electric energy from a photovoltaic generator 2 as an example of a DC power source 3 into an AC power grid 4. Whereas the AC power grid 4 is indicated as being single-phased here, the inverter 1 may also be configured and adapted to feed into a three-phase AC power grid. The inverter 1 comprises a DC/AC converter 5 connected to the AC power grid 4, which takes electric charge or energy out of a DC voltage link 6 to feed an AC current into the AC power grid 4. The DC voltage link 6 comprises a large capacitance 7 provided by one or more capacitors to keep the link voltage of the DC voltage link 6 constant despite the withdrawal of charge by the DC/AC converter 5 modulated at twice the grid frequency. Here the capacitance 7 is provided by an electrolytic capacitor of, for example, 1.5 mF. The DC voltage link 6 is charged via a DC/DC converter 9 out of the DC voltage link 10. The DC/DC converter 9 is provided for galvanic isolation between the AC power grid 4 and the DC power source 3 and, for example, comprises a high frequency transformer for this purpose, whose primary winding is high frequency operated via an inverter bridge whereas a current flowing from its secondary winding is rectified via a rectifier bridge (not depicted here). For the desired function of the DC/DC converter 9, a capacitance 11, which is much smaller than the capacitance 7 and which is a film capacitor 12 of, for example, 55 µF here, is sufficient in the DC voltage link 10. A further converter stage 13 is arranged upstream of the DC voltage link 10. This further converter stage does not provide a galvanic isolation between the DC voltage link 10 and the DC power source 3. Instead, it is, for example, a boost converter which allows for passively charging the capacitance 11 from the DC power source 3 even in its inactive state when, for example, the output voltage of the photovoltaic generator 2 increases with increasing solarization in the morning.

An on-board supply unit 14 of the inverter 1 feeds on-board voltage rails 15 with electric energy and generates on-board supply voltages, which are provided by the on-board voltage rails 15 to auxiliary devices of the inverter 1. The on-board supply unit 14 takes electric energy both out of the DC voltage link 10 and the DC voltage link 6. The on-board supply unit 14 feeds the on-board voltage rails 15 primarily and as long as possible with electric energy out of the DC voltage link 10. Only if the link voltage in the DC voltage link 10 is insufficient, the on-board supply unit 14 feeds the on-board voltage rails 15 out of the DC voltage link 6. The on-board voltage rails 15 particularly serve for supplying electric energy to a controller 60 of the inverter 1, which for example controls switches of inverter bridges of the DC/AC converter 5 and of the DC/DC converter 9 in a coordinated way (not depicted here). Due to feeding the on-board voltage rails 15 with electric energy out of the DC voltage link 10, electric energy is available by the on-board voltage rails 15 as soon as the DC power source 3 charges the DC voltage link 10. If, however, the DC voltage link 10 breaks down together with the DC power source 3, there is still sufficient electric energy for feeding the on-board voltage rails 15 for a longer period of time in form of electric charge stored in the electrolytic capacitor 8 to, for example, shut down the controller 60 in a controlled manner.

Figure 2:
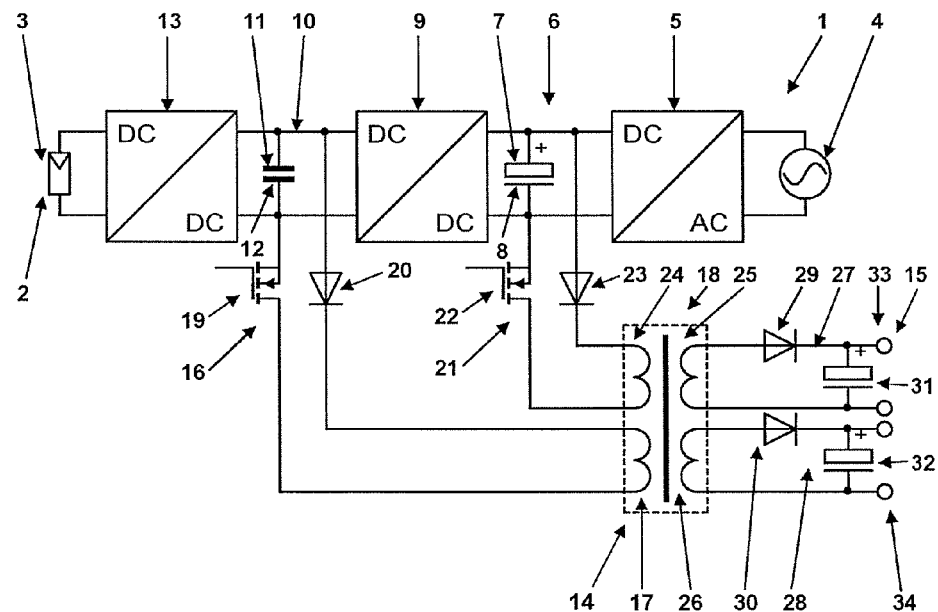
FIG. 2 shows the power inverter according to FIG. 1 with further details of its on-board power supply.

In addition to the details depicted in FIG. 1, FIG. 2 shows the following details of the power inverter 1. The on-board supply unit 14 comprises a flyback converter with two input flyback converter branches 16 and 21 and a transformer 18. The flyback converter branch 16 feeds a primary winding 17 of the transformer 18 out of the DC voltage link 10. The flyback converter branch 16 comprises a semiconductor switch 19 and a diode 20 as its essential components. The flyback converter branch 21 which is also made of a semiconductor switch 22 and a diode 23 is provided for feeding a further primary winding 24 of the transformer 18 out of the DC voltage link 6. The two primary windings 17 and 24 of the transformer 18 are electrically isolated with regard to each other. Each of the secondary windings 25 and 26 of the transformer which are also electrically isolated with regard to each other feeds one of several output circuits 33 and 34 of the on-board supply unit 14 via a rectifier circuitry 27 and 28, respectively. Each of the rectifier circuitries 27 and 28 essentially consists of a diode 29 and 30, respectively, and a capacitor 31 and 32, respectively. The various output circuits 33 and 34 serve for providing different and galvanically de-coupled on-board supply voltages via the on-board voltage rails 15 to the controller of the inverter. The semiconductor switches 19 and 22 are controlled to feed electric energy out of the respective DC voltage link 10 and 6, respectively, into the transformer 18. If electric energy is fed out of both DC voltage links 10 and 6 at the same time, the control signals of the semiconductor switches 19 and 22 are to be synchronized, and they may always be synchronized. All output circuits 33 and 34 of the on-board supply unit 14 are always simultaneously fed out of each of the DC voltage links 6 and 10.

Figure 3:
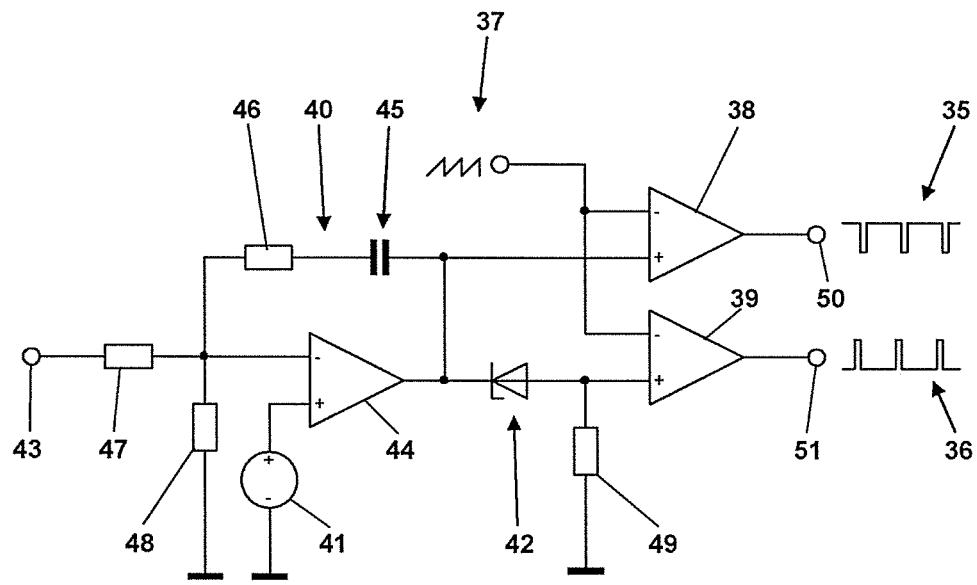
FIG. 3 shows an example of a voltage controller of the on-board power supply of the power inverter according to FIGS. 1 and 2.

FIG. 3 illustrates how control signals 35 and 36 for both semiconductor switches 19 and 22 may be generated. The frequency of the control signals 35 and 36 is provided by a sawtooth voltage 37 which is applied to one input of comparators 38 and 39. A control signal from a PI-controller 40 whose reference value is provided by a voltage source 41 is applied to the respective other input of the comparators 38 and 39. Here, the control signal is directly applied to the other input of the comparator 38, whereas a Zener-diode 42 is connected between the PI-controller 40 and the comparator 39, which is biased via a resistor 49. The required feedback for comparison with the reference value is provided to the PI-controller by the input 43, which is connected to the on-board voltage rails 15 according to FIGS. 1 and 2 at which an on-board supply voltage is present. A core component of the PI-controller is an operational amplifier 44. The characteristic of the PI-controller is defined by a capacitor 45 and by resistors 46 and 47. A resistor 48 serves for adjusting the operation point. For the purpose of keeping the two flyback converters 16 and 21 according to FIG. 2 galvanically isolated although their control signals 35 and 36 are generated by a common circuitry according to FIG. 3, it is desirably in one embodiment to arrange an optocoupler in at least one of the outputs 50 and 51 of this common circuitry, particularly in the output connected to the respective other semiconductor switch or flyback converter branch at which the circuitry according to FIG. 3 is not residing.

Whereas the circuitry according to FIG. 3 illustrates a generation of the control signals 35 and 36 in a so-called voltage-mode, the generation of such control signals with modulated pulse width may also be done in a usual current mode in that the output signal of the PI-controller 40 is not compared with a sawtooth voltage 34 but in that a comparison is made with the current actually flowing in the respective flyback converter branch.

Figure 4:
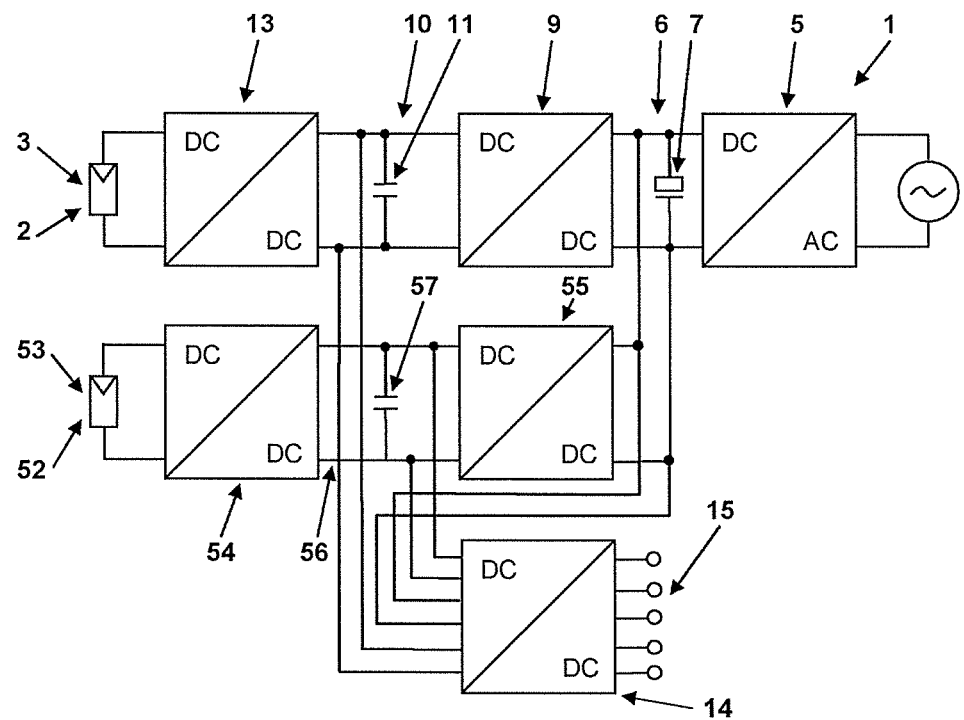
FIG. 4 illustrates a second embodiment of the power inverter.

In the embodiment of the inverter 1 illustrated in FIG. 4, the DC voltage link 6 at the input of the DC/AC converter 5 is not only charged via the one DC/DC converter 9 but also via a second DC/DC converter 55 connected in parallel to the DC/DC converter 9. An input DC voltage link 56 of the second DC/DC converter 55 is connected to a second DC power source 53 in form of a second photovoltaic generator 52 via a second converter stage 54. The second DC/DC converter 55 does and the second converter stage 54 does not provide a galvanic isolation of the DC voltage link 6 from the DC power source 53. Here, the on-board supply unit 14 primarily feeds the on-board voltage rails 15 with electric energy out of both DC voltage links 10 and 56 having small capacitances 11 and 57, which are galvanically isolated from each other and from the DC voltage link 6 by the two DC/DC converters 9 and 55. This galvanic isolation continues to the area of the on-board supply unit 14. A breakdown of the link voltage of one of the DC voltage links 10 and 56 due to a failure in the area of the DC voltage source 3 or 53, respectively, thus does not result in a breakdown of the on-board supply unit 14 even after a longer period of time. Secondarily, the on-board supply unit 14 feeds the on-board voltage rails 15 with electric energy out of the DC voltage link 6 with the large capacitance 7 arranged between the two DC/DC converters 9 and 55 and the DC/AC converter 5.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A power inverter for feeding electric energy from at least one DC power source into an AC power grid, the inverter comprising:
   a DC/AC converter configured and adapted to be connected to the AC power grid;
   at least one DC/DC converter arranged upstream of the DC/AC converter and configured to provide a galvanic isolation between its input and output;
   a first DC voltage link arranged at the input of the at least one DC/DC converter, and configured and adapted to be connected to the at least one DC power source;
   at least one further DC voltage link arranged between the DC/DC converter and the DC/AC converter, and which is galvanically isolated from the first DC voltage link by the DC/DC converter;
   a controller configured to provide control signals to the DC/AC converter and the at least one DC/DC converter;
   on-board voltage rails configured and adapted to supply the controller with electric energy; and
   an on-board supply unit configured and adapted to feed the electric energy into the on-board voltage rails;
   wherein the on-board supply unit is configured and adapted to feed the electric energy both out of the first DC voltage link and out of the at least one further DC voltage link,
   wherein a capacitance of the first DC voltage link is smaller than a capacitance of the at least one further DC voltage link, and wherein the on-board supply unit comprises a transformer which comprises two primary windings electrically isolated with regard to each other, wherein one of the primary windings is fed with current out of the first DC voltage link and the other of the primary windings is fed with current out of the at least one further DC voltage link.

2. The inverter of claim 1, wherein the capacitance of the first DC voltage link is less than 50% of the capacitance of the at least one further DC voltage link.

3. The inverter of claim 2, wherein the capacitance of the first DC voltage link is less than 25% of the capacitance of the at least one further DC voltage link.

4. The inverter of claim 3, wherein the capacitance of the first DC voltage link is less than 10% of the capacitance of the at least one further DC voltage link.

5. The inverter of claim 4, wherein the capacitance of the first DC voltage link is less than 5% of the capacitance of the at least one further DC voltage link.

6. The inverter of claim 1, wherein the on-board supply unit is configured and adapted to primarily feed the electric energy into the on-board voltage rails out of the first DC voltage link and secondarily feed the electric energy into the on-board voltage rails out of the at least one further DC voltage link.

7. The inverter of claim 6, wherein the on-board supply unit comprises a voltage controller for an on-board supply voltage present at the on-board voltage rails, wherein the voltage controller is configured to define a feeding power of the on-board supply unit out of the first DC power link and a feeding power of the on-board supply unit out of the at least one further DC power link depending on a difference between the actual value of the on-board supply voltage and a reference value.

8. The inverter of claim 7, wherein different control variables for the feeding power out of the first DC power link and for the feeding power out of the at least one further DC power link are set in the voltage controller.

9. The inverter of claim 7, wherein the voltage controller is configured and adapted to be fed out of the first DC voltage link as long as the on-board supply voltage is not yet present, and by the on-board supply voltage out of the on-board supply unit afterwards.

10. The inverter of claim 6, wherein the on-board supply unit comprises a flyback converter fed out of the first DC voltage link and a flyback converter fed out of the at least one further DC voltage link.

11. The inverter of claim 10, wherein each of the flyback converters is operated in a current mode.

12. The inverter of claim 10, wherein each of the flyback converters is operated in a voltage mode.

13. The inverter of claim 6, wherein the on-board supply unit comprises a flyback converter which is configured and adapted to be fed both out of the first DC voltage link and out of the at least one further DC voltage link.

14. The inverter of claim 13, wherein the flyback converter is operated in a current mode.

15. The inverter of claim 13, wherein the flyback converter is operated in a voltage mode.

16. The inverter of claim 1, wherein the on-board supply unit is further configured and adapted to additionally feed the electric energy into the on-board voltage rails out of at least one additional link of the inverter.

17. A power inverter for feeding electric energy from at least one DC power source into an AC power grid, the inverter comprising:

a DC/AC converter configured and adapted to be connected to the AC power grid;

at least one DC/DC converter arranged upstream of the DC/AC converter and configured to provide a galvanic isolation between its input and output;

a first DC voltage link arranged at the input of the at least one DC/DC converter, and configured and adapted to be connected to the at least one DC power source;

at least one further DC voltage link arranged between the DC/DC converter and the DC/AC converter, and which is galvanically isolated from the first DC voltage link by the DC/DC converter;

a controller configured to provide control signals to the DC/AC converter and the at least one DC/DC converter;

on-board voltage rails configured and adapted to supply the controller with electric energy; and an on-board supply unit configured and adapted to feed the electric energy into the on-board voltage rails;

wherein the on-board supply unit is configured and adapted to feed the electric energy both out of the first DC voltage link and out of the at least one further DC voltage link, wherein the on-board supply unit comprises a transformer which comprises two primary windings electrically isolated with regard to each other, wherein one of the primary windings is fed with current out of the first DC voltage link and the other of the primary windings is fed with current out of the at least one further DC voltage link.

18. The inverter of claim 17, wherein the two primary windings comprise a winding ratio which is in a range of 70% to 140% of a transformation ratio of the DC/DC converter.

19. The inverter of claim 17, wherein at least one optocoupler is provided for transmitting a control signal to at least one switch through which power is fed to at least one of the galvanically isolated primary windings out of one of the two DC voltage links.

* * * * *